(12) United States Patent
Shinohara et al.

(10) Patent No.: US 10,731,753 B2
(45) Date of Patent: Aug. 4, 2020

(54) ALL-WHEEL DRIVE-VEHICLE CONTROLLER

(71) Applicant: SUBARU CORPORATION, Tokyo (JP)

(72) Inventors: Tsuyoshi Shinohara, Tokyo (JP); Musashi Murakami, Tokyo (JP); Kenichiro Okada, Tokyo (JP); Shinichiro Kojima, Tokyo (JP); Atsushi Fujie, Tokyo (JP); Shintaro Kato, Tokyo (JP); Takahiro Yamamoto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 67 days.

(21) Appl. No.: 16/206,244

(22) Filed: Nov. 30, 2018

(65) Prior Publication Data

US 2019/0293172 A1 Sep. 26, 2019

(30) Foreign Application Priority Data

Mar. 23, 2018 (JP) .................................. 2018-056662

(51) Int. Cl.
*F16H 61/02* (2006.01)
*B60K 17/344* (2006.01)
(Continued)

(52) U.S. Cl.
CPC ......... *F16H 61/0213* (2013.01); *B60K 17/02* (2013.01); *B60K 17/344* (2013.01);
(Continued)

(58) Field of Classification Search
CPC ... F16H 61/0213; B60K 17/02; B60K 17/344; B60K 17/348
See application file for complete search history.

(56) References Cited

U.S. PATENT DOCUMENTS

| 8,157,703 B2 * | 4/2012 | Saito ..................... B60K 17/35 180/248 |
| 8,489,304 B2 * | 7/2013 | Noguchi .............. B60W 10/119 701/84 |

(Continued)

FOREIGN PATENT DOCUMENTS

JP 2009-208732 A 9/2009

*Primary Examiner* — David R Morris
(74) *Attorney, Agent, or Firm* — McGinn IP Law Group, PLLC

(57) ABSTRACT

An all-wheel-drive-vehicle controller includes: a drive gear coupled to a driving source; a driven gear meshed with the drive gear and coupled to main and sub driving-wheel axle shafts transmitting torques to main and sub driving wheels, respectively; a transfer clutch interposed between the driven gear and the sub-driving-wheel axle shaft and adjusting the torque transmitted to the sub driving wheel; a first determination unit determining whether a first condition in which a torque applied to the drive gear is substantially zero is satisfied; a second determination unit determining whether a second condition in which hydraulic pressure is applied to the transfer clutch and a torque applied to the driven gear is substantially zero is satisfied; and a control unit controlling a torque adjuster to adjust the torque applied to either one of the drive gear and the driven gear if the first and second conditions are satisfied.

13 Claims, 3 Drawing Sheets

(51) Int. Cl.
*B60K 17/02* (2006.01)
*F16H 3/54* (2006.01)
*F16H 59/58* (2006.01)
*F16D 25/00* (2006.01)
*F16H 59/46* (2006.01)
*F16H 59/50* (2006.01)
*F16H 59/44* (2006.01)
*F16H 59/18* (2006.01)
*F16H 59/14* (2006.01)

(52) U.S. Cl.
CPC ............... *F16H 3/54* (2013.01); *F16D 25/00* (2013.01); *F16H 59/14* (2013.01); *F16H 59/18* (2013.01); *F16H 59/44* (2013.01); *F16H 59/46* (2013.01); *F16H 59/58* (2013.01); *F16H 2059/147* (2013.01); *F16H 2059/148* (2013.01); *F16H 2059/186* (2013.01); *F16H 2059/462* (2013.01); *F16H 2059/506* (2013.01); *F16H 2200/2005* (2013.01); *F16H 2200/2035* (2013.01)

(56) References Cited

U.S. PATENT DOCUMENTS

| | | | |
|---|---|---|---|
| 10,260,574 B2* | 4/2019 | Yamamoto | B60W 10/182 |
| 10,500,953 B2* | 12/2019 | Yamamoto | B60K 23/08 |
| 2009/0227421 A1 | 9/2009 | Saito | |
| 2011/0035090 A1* | 2/2011 | Noguchi | B60W 10/119 |
| | | | 701/31.4 |
| 2018/0031058 A1* | 2/2018 | Yamamoto | F16D 48/06 |
| 2018/0170177 A1* | 6/2018 | Yamamoto | B60K 17/344 |

* cited by examiner

ALL-WHEEL DRIVE-VEHICLE CONTROLLER

CROSS-REFERENCE TO RELATED APPLICATIONS

The present application claims priority from Japanese Patent Application No. 2018-056662 filed on Mar. 23, 2018, the entire contents of which are hereby incorporated by reference.

BACKGROUND

1. Technical Field

The present invention relates to all-wheel-drive-vehicle controllers.

2. Related Art

All-wheel-drive (AWD) vehicles (or four-wheel-drive (4WD) vehicles) that have excellent running capabilities on steep roads, bumpy roads, and slippery road surfaces (such as snow-covered roads and muddy roads) have been widely available. In such an all-wheel-drive vehicle, a center differential is provided between the front and rear wheels so as to allow a differential between the front and rear wheels, and the engaging force of the transfer clutch is controlled in accordance with the road conditions and the running state, thereby adjusting the distribution of the driving force to the sub driving wheels (such as the rear wheels).

In such an all-wheel-drive vehicle, for instance, when the steering wheel is steered by a large angle during coasting (i.e., an inertial running state in which the accelerator pedal is released), noise (gear rattle) sometimes occurs from the gears of the driving system.

Japanese Unexamined Patent Application Publication (JP-A) No. 2009-208732 discloses a technology (power transmission device) that suppresses the occurrence of noise from a transmission mechanism when an all-wheel-drive vehicle makes a turn. More specifically, in this power transmission device, in a state where a front-wheel output-shaft rotation speed Nf and a rear-wheel output-shaft rotation speed Nr exceed a predetermined value and deviate from each other and an engine rotation speed Ne and a turbine rotation speed Nt fall below a predetermined value and approach each other as a result of releasing the accelerator pedal, when the front-wheel output-shaft rotation speed Nf fluctuates at a predetermined vibration frequency, a duty ratio Rd of a clutch-pressure control valve is reduced (i.e., the engaging force of the transfer clutch is reduced). Thus, vibrations in the front-wheel output shaft are minimized, so that the occurrence of noise from the transmission mechanism is suppressed.

SUMMARY OF THE INVENTION

An aspect of the present invention provides an all-wheel-drive-vehicle controller including a drive gear, a driven gear, a transfer clutch, a first determination unit, a second determination unit, and a control unit. The drive gear is coupled to a driving source in a torque transmittable manner. The driven gear is meshed with the drive gear and is coupled to a main driving-wheel axel shaft and a sub-driving-wheel axle shaft in a torque transmittable manner. The main-driving-wheel axel shaft is configured to transmit a torque to a main driving wheel. The sub-driving-wheel axle shaft is configured to transmit a torque to a sub driving wheel. The transfer clutch is interposed between the driven gear and the sub-driving-wheel axle shaft and is configured to adjust the torque to be transmitted to the sub driving wheel. The first determination unit is configured to determine whether a first condition in which a torque applied to the drive gear is substantially zero is satisfied. The second determination unit is configured to determine whether a second condition in which hydraulic pressure is applied to the transfer clutch and a torque applied to the driven gear is substantially zero is satisfied. The control unit is configured to control a torque adjuster so as to adjust the torque applied to either one of the drive gear and the driven gear in a case where the first determination unit determines that the first condition is satisfied and the second determination unit determines that the second condition is satisfied.

An aspect of the present invention provides an all-wheel-drive-vehicle controller including a drive gear, a driven gear, a transfer clutch, and circuitry. The drive gear is coupled to a driving source in a torque transmittable manner. The driven gear is meshed with the drive gear and is coupled to a main driving-wheel axel shaft and a sub-driving-wheel axle shaft in a torque transmittable manner. The main-driving-wheel axel shaft is configured to transmit a torque to a main driving wheel. The sub-driving-wheel axle shaft is configured to transmit a torque to a sub driving wheel. The transfer clutch is interposed between the driven gear and the sub-driving-wheel axle shaft and is configured to adjust the torque to be transmitted to the sub driving wheel. The circuitry is configured to determine whether a first condition in which a torque applied to the drive gear is substantially zero is satisfied. The circuitry is configured to determine whether a second condition in which hydraulic pressure is applied to the transfer clutch and a torque applied to the driven gear is substantially zero is satisfied. The circuitry is configured to control a torque adjuster so as to adjust the torque applied to either one of the drive gear and the driven gear in a case where the first condition and the second condition are determined to be satisfied.

DETAILED DESCRIPTION

Figure 1:
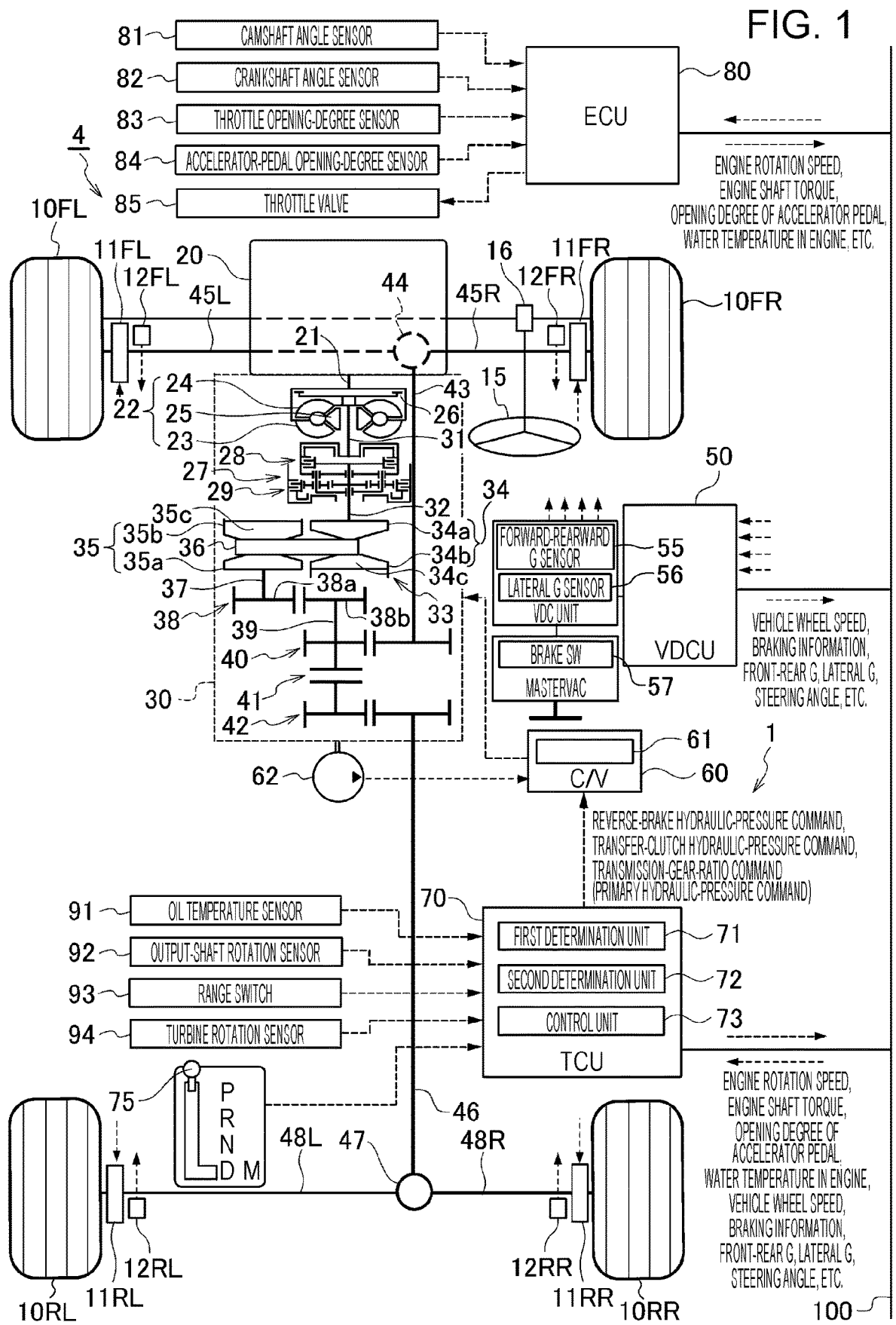
FIG. 1 illustrates the overall configuration of an all-wheel-drive-vehicle controller according to an example as well as a power train and a driving-force transmission system of an all-wheel-drive vehicle equipped with the controller.

A preferred example of the present invention will be described below with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. In the drawings, identical or equivalent sections will be given the same reference signs. Moreover, identical components will be given the same reference signs in the drawings, and redundant descriptions thereof will be omitted.

As described above, according to the technology (power transmission device) disclosed in JP-A No. 2009-208732, when vibrations occur in the front-wheel output shaft that may lead to the occurrence of noise from the transmission mechanism, the engaging force of the transfer clutch is reduced until the vibrations in the front-wheel output shaft are eliminated, so that the occurrence of noise from the transmission mechanism can be suppressed. However, if the torque is inverted due to the accelerator pedal being turned on from an off mode while the engaging force (i.e., hydraulic pressure) of the transfer clutch is being reduced, gear rattle (i.e., gear rattle occurring from the gear teeth abutting against each other) may possibly occur in the driving system. Therefore, there are demands for preventing the occurrence of noise without reducing the hydraulic pressure (i.e., the engaging force) of the transfer clutch.

It is desirable to provide an all-wheel-drive-vehicle controller having a transfer clutch that adjusts a torque (i.e., a driving force) to be transmitted toward a sub driving wheel and capable of preventing the occurrence of noise (gear rattle) from the gears of the driving system without reducing the hydraulic pressure (engaging force) of the transfer clutch when the steering wheel is steered during coasting in which the accelerator pedal is released (i.e., turned off).

As a result of keen examinations performed with regard to the aforementioned problems, the present inventors have discovered that, when the steering wheel is steered during coasting in which the accelerator pedal is released (i.e., turned off), differential rotation occurs between the front and rear wheels so that the transfer clutch becomes engaged, thereby causing, for instance, the rear wheels to have a positive torque and the front wheels to have a negative torque. When the two torques (i.e., the positive torque and the negative torque) balance out, a torque applied to a gear of the driving system (e.g., a secondary reduction driven gear) becomes substantially zero. In this case, when the engine torque becomes zero, a torque applied to another gear (e.g., a secondary reduction drive gear) meshed with the aforementioned gear also becomes substantially zero, causing the tooth flank of the pair of gears (such as the secondary reduction drive and driven gears) to be in a loose state (i.e., a state where the backlash of the pair of gears is not shifted toward either one of the driving side and the coasting side). As a result, the pair of gears (such as the secondary reduction drive and driven gears) rotate and vibrate due to hydraulic fluctuations (hydraulic pulsations) according to the driving frequency of an electromagnetic valve that adjusts the hydraulic pressure of the transfer clutch, thus causing noise (gear rattle) to occur.

Figure 2:
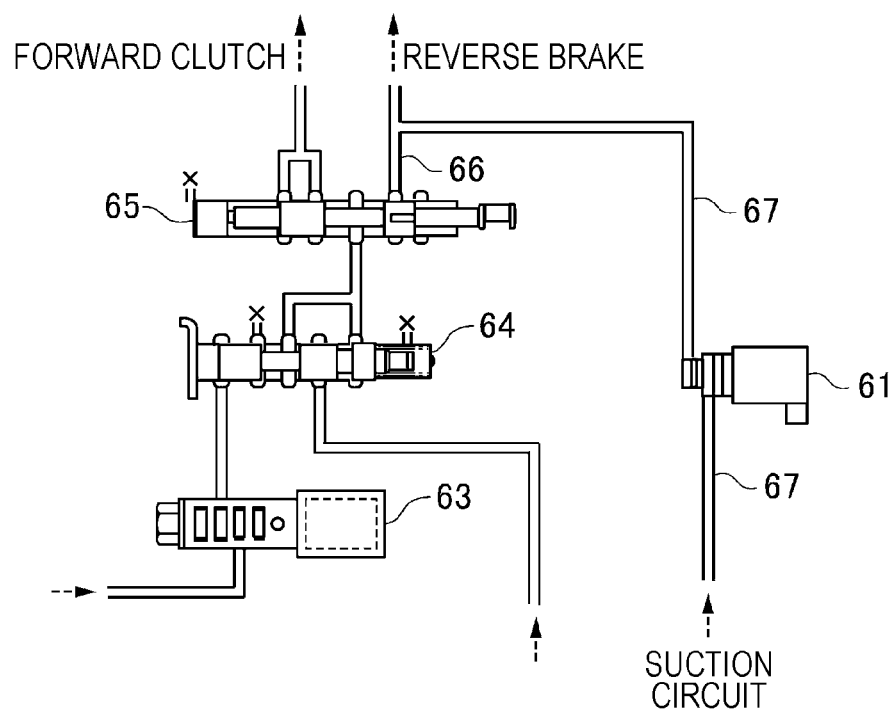
FIG. 2 illustrates the configuration of a hydraulic circuit that supplies hydraulic pressure to a forward-reverse switching mechanism.

First, the configuration of an all-wheel-drive-vehicle controller 1 according to an example will be described with reference to FIGS. 1 and 2. FIG. 1 illustrates the overall configuration of the all-wheel-drive-vehicle controller 1 as well as a power train and a driving-force transmission system of an all-wheel-drive (AWD) vehicle 4 equipped with the controller 1. FIG. 2 illustrates the configuration of a hydraulic circuit that supplies hydraulic pressure to a forward-reverse switching mechanism 27. The AWD vehicle 4 according to this example is equipped with a continuously variable transmission (CVT) 30.

Although an engine 20 may be of any type, the engine 20 is, for instance, a horizontally-opposed direct-injection four-cylinder gasoline engine. In the engine 20, air taken in from an air cleaner (not illustrated) is reduced in pressure by an electronically-controlled throttle valve (also simply referred to as "throttle valve" hereinafter) 85 provided in an intake pipe, travels through an intake manifold, and is taken into the cylinders disposed in the engine 20. In this case, the amount of air taken in from the air cleaner is detected by an airflow meter. Furthermore, a throttle opening-degree sensor 83 that detects the opening degree of the throttle valve 85 is disposed in the throttle valve 85. An injector that injects fuel is attached to each cylinder. Moreover, an ignition plug that ignites an air-fuel mixture and an igniter-containing coil that applies high voltage to the ignition plug are also attached to each cylinder. In each cylinder of the engine 20, the air-fuel mixture containing the intake air and the fuel injected by the injector is ignited by the ignition plug so as to be combusted. Exhaust gas after the combustion is discharged via an exhaust pipe.

In addition to the airflow meter and the throttle opening-degree sensor 83 described above, a camshaft angle sensor 81 that identifies the cylinders of the engine 20 is attached to the vicinity of a camshaft of the engine 20. Moreover, a crankshaft angle sensor 82 that detects the position of a crankshaft of the engine 20 is attached to the vicinity of the crankshaft. These sensors are coupled to an engine control unit (referred to as "ECU" hereinafter) 80 to be described later. The ECU 80 is also coupled to various sensors, such as an accelerator-pedal opening-degree sensor 84 that detects the degree of depression of the accelerator pedal, that is, the opening degree of the accelerator pedal, and a water temperature sensor that detects the temperature of a coolant in the engine 20.

An output shaft (crankshaft) 21 of the engine 20 is coupled to the CVT 30 that converts and outputs the driving force from the engine 20 via a torque converter 22 having a clutch function and a torque amplifying function and via the forward-reverse switching mechanism 27. In one example, the forward-reverse switching mechanism 27 may serve as a "torque adjuster".

The torque converter 22 mainly includes a pump impeller 23, a turbine runner 24, and a stator 25. The pump impeller 23 coupled to the output shaft 21 creates a flow of oil, and the turbine runner 24 disposed facing the pump impeller 23 receives the power from the engine 20 via the oil so as to drive the output shaft 21. The stator 25 disposed between the pump impeller 23 and the turbine runner 24 rectifies the discharge flow from the turbine runner 24 so as to reduce it to the pump impeller 23, thereby producing a torque amplifying effect.

The torque converter 22 has a lock-up clutch 26 that sets an input and an output in a directly-coupled state. When the lock-up clutch 26 is not engaged (i.e., in a non-locked-up state), the torque converter 22 amplifies the driving force of the engine 20 and transmits the amplified driving force to the CVT 30. When the lock-up clutch 26 is engaged (i.e., in a locked-up state), the torque converter 22 directly transmits the driving force of the engine 20 to the CVT 30. The rotation speed (turbine rotation speed) of the turbine runner 24 constituting the torque converter 22 is detected by a turbine rotation sensor 94. The detected turbine rotation speed is output to a transmission control unit (TCU) 70 to be described later.

The forward-reverse switching mechanism 27 is configured to switch between forward rotation and reverse rotation (i.e., forward travel mode and rearward travel mode of the AWD vehicle 4) of driving wheels 10 (i.e., a left front wheel 10FL, a right front wheel 10FR, a left rear wheel 10RL, and a right rear wheel 10RR). The forward-reverse switching mechanism 27 mainly includes a double-pinion planetary gear train, a forward clutch 28, and a reverse brake 29. In the forward-reverse switching mechanism 27, the state of each of the forward clutch 28 and the reverse brake 29 is controlled so that the transmission path for the driving force of the engine 20 can be switched.

More specifically, in a case where the drive (D) range is selected, the forward clutch 28 is engaged and the reverse brake 29 is released, so that the rotation of a turbine shaft 31 is directly transmitted to a primary shaft 32, to be described later, thereby causing the AWD vehicle 4 to travel forward. When the reverse (R) range is selected, the forward clutch 28 is released and the reverse brake 29 is engaged, so that the planetary gear train is actuated and the primary shaft 32 can thus be rotated in the reverse direction, thereby causing the AWD vehicle 4 to travel rearward.

When either one of the neutral (N) range and the parking (P) range is selected, the forward clutch 28 and the reverse brake 29 are released so that the turbine shaft 31 and the primary shaft 32 are separated from each other (i.e., the transmission of the driving force of the engine 20 is cut off), whereby the forward-reverse switching mechanism 27 switches to a neutral state where power is not transmitted to the primary shaft 32. The operation of the forward clutch 28 and the operation of the reverse brake 29 are controlled by the TCU 70 and a valve body (control valve) 60.

A transmission mechanism (variator) 33 of the CVT 30 includes the primary shaft 32 coupled to the turbine shaft 31 of the torque converter 22 via the forward-reverse switching mechanism 27, and also includes a secondary shaft 37 disposed parallel to the primary shaft 32.

The primary shaft 32 is provided with a primary pulley 34. The primary pulley 34 includes a stationary pulley 34a joined to the primary shaft 32 and a movable pulley 34b attached facing the stationary pulley 34a in a slidable manner in the axial direction of the primary shaft 32, such that the distance between the cone surfaces of the pulleys 34a and 34b, that is, the pulley groove width, is changeable. The secondary shaft 37 is provided with a secondary pulley 35. The secondary pulley 35 includes a stationary pulley 35a joined to the secondary shaft 37 and a movable pulley 35b attached facing the stationary pulley 35a in a slidable manner in the axial direction of the secondary shaft 37, such that the pulley groove width is changeable.

A chain 36 that transmits a driving force is wrapped between the primary pulley 34 and the secondary pulley 35. By changing the groove widths of the primary pulley 34 and the secondary pulley 35 to change the ratio (pulley ratio) of the diameter by which the chain 36 is wrapped around the pulleys 34 and 35, the transmission gear ratio is continuously changed. Assuming that the diameter by which the chain 36 is wrapped around the primary pulley 34 is defined as Rp and the diameter by which the chain 36 is wrapped around the secondary pulley 35 is defined as Rs, a transmission gear ratio i is expressed as follows: i=Rs/Rp. Thus, the transmission gear ratio i is determined by dividing a rotation speed Np of the primary pulley 34 by a rotation speed Ns of the secondary pulley 35 (i=Np/Ns).

The primary pulley 34 (i.e., the movable pulley 34b) has a hydraulic chamber 34c. The secondary pulley 35 (i.e., the movable pulley 35b) has a hydraulic chamber 35c. The groove widths of the primary pulley 34 and the secondary pulley 35 are set and changed by adjusting a primary hydraulic pressure introduced to the hydraulic chamber 34c of the primary pulley 34 and a secondary hydraulic pressure introduced to the hydraulic chamber 35c of the secondary pulley 35.

The secondary shaft 37 of the CVT 30 is coupled to a counter shaft 39 via a reduction gear 38 including a pair of gears (i.e., a reduction drive gear 38a and a reduction driven gear 38b). In one example, the reduction drive gear 38a and the reduction driven gear 38b may serve as a "drive gear" and a "driven gear" respectively. The driving force converted by the CVT 30 is transmitted to the counter shaft 39 via the reduction gear 38. The counter shaft 39 is coupled to a front drive shaft 43 via a counter gear 40 including a pair of gears (i.e., a counter drive gear and a counter driven gear). The driving force transmitted to the counter shaft 39 is transmitted to a front differential 44 via the counter gear 40 and the front drive shaft 43. In one example, the front drive shaft 43 may serve as a "main-driving-wheel axel shaft". The front differential 44 is, for instance, a bevel-gear differential device. The driving force from the front differential 44 is transmitted to the left front wheel 10FL via a left-front-wheel drive shaft 45L and also to the right front wheel 10FR via a right-front-wheel drive shaft 45R.

A transfer clutch 41 that adjusts the driving force to be transmitted to a rear differential 47 is disposed behind the counter gear 40 (i.e., counter drive gear) on the aforementioned counter shaft 39. The engaging force of the transfer clutch 41 (i.e., the ratio of torque distribution to the rear wheels (sub driving wheels) 10RL and 10RR) is controlled in accordance with the driving state of the four wheels (e.g., the slipping of the front wheels 10FL and 10FR) and the engine torque. Thus, the driving force transmitted to the counter shaft 39 is distributed in accordance with the engaging force of the transfer clutch 41 so as to be transmitted also to the rear wheels 10RL and 10RR.

More specifically, the rear end of the counter shaft 39 is coupled to a rearward-extending propeller shaft 46 via a transfer gear 42 including a pair of gears (i.e., a transfer drive gear and a transfer driven gear). In one example, the rearward-extending propeller shaft 46 may serve as a "sub-driving-wheel axle shaft". Thus, the driving force transmitted to the counter shaft 39 and adjusted (distributed) by the transfer clutch 41 is transmitted from the transfer gear 42 (transfer driven gear) to the rear differential 47 via the propeller shaft 46.

The rear differential 47 is coupled to a left-rear-wheel drive shaft 48L and a right-rear-wheel drive shaft 48R. The driving force from the rear differential 47 is transmitted to the left rear wheel 10RL via the left-rear-wheel drive shaft 48L, and also to the right rear wheel 10RR via the right-rear-wheel drive shaft 48R.

With the driving-force transmission system of the power train configured as described above, for instance, when the select lever of transmission is operated to the D range, the driving force of the engine 20 is input to the primary shaft 32 of the CVT 30. The driving force converted by the CVT 30 is output from the secondary shaft 37 and is transmitted to the front drive shaft 43 via the reduction gear 38, the counter shaft 39, and the counter gear 40. Then, the driving force is distributed to the left and right sides by the front differential 44 so as to be transmitted to the left and right front wheels 10FL and 10FR. Therefore, when the AWD vehicle 4 is running, the left and right front wheels 10FL and 10FR are constantly driven.

The driving force transmitted to the counter shaft 39 is partially transmitted to the propeller shaft 46 via the transfer clutch 41 and the transfer gear 42. When a predetermined clutch torque is applied to the transfer clutch 41, the driving force distributed in accordance with the clutch torque is output to the propeller shaft 46. Then, the driving force is also transmitted to the rear wheels 10RL and 10RR via the rear differential 47.

Brakes 11FR to 11RR that apply braking forces to the wheels 10FR to 10RR are attached to the wheels 10FR to 10RR, respectively. The wheels 10FR to 10RR may sometimes be collectively referred to as "wheels 10" hereinafter, and the brakes 11FR to 11RR may sometimes be collectively referred to as "brakes 11" hereinafter. Moreover, wheel speed sensors 12FR to 12RR that detect the rotation speeds of the wheels 10FR to 10RR are respectively attached thereto. The wheel speed sensors 12FR to 12RR may sometimes be collectively referred to as "wheel speed sensors 12" hereinafter.

In this example, disk brakes are used as the brakes 11. Each brake 11 includes a brake disk attached to the corresponding wheel 10 of the AWD vehicle 4 and a brake caliper containing a brake pad and a wheel cylinder. During braking operation, the brake pad is pressed against the brake disk by hydraulic pressure, and the wheel 10 coupled to the brake disk is stopped by a frictional force. Although each of the brakes 11 used in this example is a disk brake, for instance, a drum brake that applies a braking force by pressing a frictional material against the inner peripheral surface of a drum may be used as an alternative.

Each wheel speed sensor 12 is a noncontact sensor that detects a change in a magnetic field caused by a rotor (either one of a gear rotor and a magnetic rotor) that rotates together with the corresponding wheel 10. For instance, a semiconductor sensor that detects the rotation of the rotor using a Hall device or a magneto-resistive (MR) device is preferably used.

The AWD vehicle 4 is also equipped with a vehicle dynamic control (VDC) unit (referred to as "VDCU" hereinafter) 50 that ensures excellent running stability by preventing side slipping when, for instance, the AWD vehicle 4 enters a corner at an excessive speed or the vehicle orientation (behavior) is disturbed due to a sudden operation of the steering wheel.

The hydraulic pressure used for changing the transmission gear ratio of the CVT 30, that is, the primary hydraulic pressure and the secondary hydraulic pressure mentioned above, is controlled by the valve body (control valve) 60. The valve body 60 opens and closes an oil passage in the valve body 60 by using a spool valve and a solenoid valve (electromagnetic valve) that moves the spool valve, so as to adjust the hydraulic pressure of oil discharged from an oil pump 62, thereby supplying the hydraulic pressure to the hydraulic chamber 34c in the primary pulley 34 and the hydraulic chamber 35c in the secondary pulley 35. Likewise, the valve body 60 opens and closes the oil passage in the valve body 60 by using the spool valve and the solenoid valve (electromagnetic valve) that moves the spool valve, so as to adjust the hydraulic pressure of oil discharged from the oil pump 62, thereby supplying the hydraulic pressure used for engaging and releasing the transfer clutch 41. The solenoid valve that adjusts the hydraulic pressure to be supplied to the transfer clutch 41 is, for instance, a duty solenoid that can control the driving amount in accordance with the duty ratio of applied voltage.

The changing of the transmission gear ratio of the CVT 30 is controlled by the TCU 70. Specifically, the TCU 70 controls the driving of the solenoid valve (electromagnetic valve) constituting the aforementioned valve body 60 so as to adjust the hydraulic pressure supplied to the hydraulic chamber 34c in the primary pulley 34 and the hydraulic chamber 35c in the secondary pulley 35, thereby changing the transmission gear ratio of the CVT 30. Likewise, the TCU 70 controls the driving of the solenoid valve constituting the aforementioned valve body 60 so as to adjust the hydraulic pressure supplied to the transfer clutch 41, thereby adjusting the distribution ratio of the driving force transmitted to the rear wheels 10RL and 10RR.

As illustrated in FIG. 2, the TCU 70 controls the driving of a clutch linear solenoid 63 and a clutch valve 64 constituting the aforementioned valve body 60 so as to adjust the amount of oil supplied to or discharged from either one of the forward clutch 28 and the reverse brake 29, thereby engaging or releasing either one of the forward clutch 28 and the reverse brake 29. Whether the oil is to be supplied toward (or discharged from) the forward clutch 28 or is to be supplied toward (or discharged from) the reverse brake 29 depends on switching operation of a manual valve 65 configured to move in conjunction with a shift lever 75.

The vehicle floor (i.e., the center console) is provided with the shift lever (select lever for transmission) 75 that receives an operation performed by the driver for selecting the operation state (range) of the CVT 30. A range switch 93 that detects the selected position of the shift lever 75 is attached to the shift lever 75 such that the range switch 93 moves in conjunction with the shift lever 75. The range switch 93 is coupled to the TCU 70 such that the TCU 70 reads the detected selected position of the shift lever 75. The shift lever 75 can be used for selectively switching among the parking (P) range, the reverse (R) range, and the neutral (N) range, in addition to the drive (D) range and the manual (M) range. The shift lever 75 may alternatively be replaced with a switch-button selecting mechanism.

In a case where the D range (forward travel range) is selected by operating the shift lever 75, the manual valve 65 moves leftward in FIG. 2, so that oil is supplied to the hydraulic chamber in the forward clutch 28 and is discharged from the hydraulic chamber in the reverse brake 29. Accordingly, the forward clutch 28 switches to an engaged state, and the reverse brake 29 switches to a released state, so that the AWD vehicle 4 becomes capable of traveling forward. In a case where the R range (rearward-travel range) is selected by operating the shift lever 75, the manual valve 65 moves rightward in FIG. 2, so that oil is supplied to the hydraulic chamber in the reverse brake 29 and is discharged from the hydraulic chamber in the forward clutch 28. Accordingly, the reverse brake 29 switches to an engaged state, and the forward clutch 28 switches to a released state, so that the AWD vehicle 4 becomes capable of traveling rearward. In a case where either one of the N range and the P range is selected by operating the shift lever 75, oil is discharged from each of the hydraulic chamber in the forward clutch 28 and the hydraulic chamber in the reverse brake 29. Accordingly, the forward clutch 28 and the reverse brake 29 switch to a released state (i.e., the transmission of the driving force of the engine 20 is cut off), whereby the CVT 30 switches to a neutral state.

The hydraulic circuit that supplies hydraulic pressure to the forward-reverse switching mechanism 27 (i.e., the forward clutch 28 and the reverse brake 29) can apply hydraulic pressure to the reverse brake 29 during the D range (forward travel range). More specifically, this hydraulic circuit includes a hydraulic pipe (circuit) 67 that allows a hydraulic pipe (circuit) 66 and, for instance, a suction circuit to communicate with each other, and also includes a solenoid valve 61 that opens and closes the hydraulic pipe (circuit) 67. The hydraulic pipe (circuit) 66 allows the manual valve 65 and the hydraulic chamber in the reverse brake 29 to communicate with each other. In this example, the solenoid valve 61 used is, for instance, an on-off valve that switches between on and off modes in accordance with the applied duty ratio. From the standpoint of interlock prevention, the hydraulic pressure of oil supplied via the hydraulic pipe (circuit) 67 is always set (adjusted) to a pressure (hydraulic pressure) that is lower than the hydraulic pressure supplied to the forward clutch 28. The driving of the solenoid valve 61 is controlled by the TCU 70. This will be described in detail later.

As described above, the changing of the transmission gear ratio of the CVT 30, the engaging and releasing of the forward clutch 28 and the reverse brake 29 (i.e., the switching between forward and rearward travel modes) and the engaging and releasing of the transfer clutch 41 (i.e., the distribution of the driving force) are controlled by the TCU 70. The TCU 70 is coupled to the ECU 80 that comprehensively controls the engine 20 and also to the VDCU 50 in a communicable manner via, for instance, a controlled area network (CAN) 100.

The TCU 70, the ECU 80, and the VDCU 50 each include a micro-processor that performs calculations, an electrically erasable programmable read-only memory (EEPROM) that stores programs for causing the micro-processor to execute processes, a random access memory (RAM) that stores various types of data, such as calculation results, a backup RAM where storage contents are stored by a battery, and an input-output interface (IF).

In the ECU 80, each cylinder is identified from an output of the camshaft angle sensor 81, and the engine rotation speed is determined from a change of rotational position of the crankshaft detected from an output of the crankshaft angle sensor 82. Moreover, in the ECU 80, various types of information, such as the amount of intake air, the opening degree of the accelerator pedal, the air-fuel ratio of the air-fuel mixture, and the water temperature, are acquired based on detection signals input from the aforementioned various sensors. Then, based on these acquired types of information, the ECU 80 comprehensively controls the engine 20 by controlling the fuel injection amount, the ignition timing, and the various devices, such as the throttle valve 85.

The ECU 80 transmits, to the TCU 70, various types of information, such as the water temperature (coolant temperature) in the engine 20, the opening degree of the accelerator pedal, the engine rotation speed, and the engine shaft torque, via the CAN 100.

The VDCU 50 is coupled to the four wheel speed sensors 12FL to 12RR, a steering angle sensor 16, a forward-rearward acceleration (forward-rearward G) sensor 55, a lateral acceleration (lateral G) sensor 56, and a brake switch 57. As described above, the wheel speed sensors 12FL to 12RR detect the rotation of gears attached to the centers of the wheels 10FL to 10RR by using, for instance, magnetic pickup units so as to detect the rotational state of the wheels 10FL to 10RR. The forward-rearward acceleration sensor 55 detects acceleration acting on the AWD vehicle 4 in the front-rear direction thereof (sometimes simply referred to as "acceleration" hereinafter). The lateral acceleration sensor 56 detects acceleration acting on the AWD vehicle 4 in the lateral direction. The steering angle sensor 16 detects the rotational angle of a pinion shaft so as to detect a turning angle of the front wheels 10FL and 10FR serving as steer wheels (i.e., a steering angle of a steering wheel 15).

The VDCU 50 performs braking operation on the AWD vehicle 4 by driving a brake actuator in accordance with the operation amount (i.e., the degree of depression) of the brake pedal, detects the vehicle behavior by using various sensors (such as the wheel speed sensors 12, the steering angle sensor 16, the acceleration sensors 55 and 56, and a yaw rate sensor), controls the brakes based on automatic pressure, and controls the torque of the engine 20, so as to suppress side slipping and to ensure the stability of the AWD vehicle 4 when making a turn. Specifically, the VDCU 50 ensures excellent running stability by preventing side slipping when, for instance, the AWD vehicle 4 enters a corner at an excessive speed or the vehicle orientation (behavior) is disturbed due to a sudden operation of the steering wheel. More specifically, when the VDCU 50 detects the vehicle orientation (behavior) by using the aforementioned sensors and detects an oversteer state, the VDCU 50 performs control for applying a braking force to either one of the front wheels 10Fl and 10FR at the outer side of the corner. In contrast, when the VDCU 50 detects an understeer state, the VDCU 50 performs control for reducing the engine power and applying a braking force to either one of the rear wheels 10RL and 10RR at the inner side of the corner. The VDCU 50 performs this control automatically in accordance with the driving conditions. In addition to the VDC (side slip prevention) function described above, the VDCU 50 also has an anti-lock brake system (ABS) function and a traction control system (TCS) function.

The VDCU 50 transmits, to the TCU 70, the detected wheel speeds of the wheels 10, the detected steering angle, the detected forward-rearward acceleration, the detected lateral acceleration, and the detected braking information via the CAN 100.

In addition to the turbine rotation sensor 94 described above, the TCU 70 is coupled to an oil temperature sensor 91 that detects the oil temperature of the CVT 30, an output-shaft rotation sensor 92 that detects the rotation speed of the secondary shaft (output shaft) 37 (i.e., the rotation speed of the secondary pulley 35), and the range switch 93 that detects the selected position of the shift lever.

As described above, the TCU 70 receives, from the VDCU 50, the wheel speeds of the wheels 10, the steering angle, the forward-rearward acceleration, the lateral acceleration, and the braking information via the CAN 100, and also receives, from the ECU 80, information, such as the water temperature (coolant temperature) in the engine 20, the opening degree of the accelerator pedal, the engine rotation speed, and the engine shaft torque (output torque).

In accordance with a shift map, the TCU 70 automatically changes the transmission gear ratio in a continuous manner in accordance with the driving state of the AWD vehicle 4 (e.g., the opening degree of the accelerator pedal and the vehicle speed). The shift map is stored in, for instance, the EEPROM in the TCU 70.

Based on the various types of information acquired from the various sensors described above, the TCU 70 executes transfer clutch control (i.e., driving-force distribution control). Specifically, the TCU 70 controls the engaging force of the transfer clutch 41 (i.e., the distribution ratio of the driving force to the rear wheels 10RL and 10RR) in real time based on the driving state of the AWD vehicle 4 (e.g., the drive state of the four wheels and the engine torque).

When the steering wheel 15 is steered during coasting in which the accelerator pedal is released (i.e., turned off), differential rotation occurs between the front and rear wheels, thus causing the transfer clutch 41 to receive hydraulic pressure (i.e., to engage). This causes the rear wheels 10RL and 10RR to have a positive torque, and the front wheels 10FL and 10FR to have a negative torque. When the two torques (i.e., the positive torque and the negative torque) balance out, a torque applied to the reduction driven gear 38b becomes substantially zero. In this case, when the engine torque becomes zero, a torque applied to the reduction drive gear 38a meshed with the reduction driven gear 38b also becomes substantially zero, causing the tooth flank of the reduction gear 38 to be in a loose state (i.e., a state where the backlash of the reduction gear 38 is not shifted toward either one of the driving side and the coasting side). Thus, the reduction gear 38 (i.e., the reduction drive gear 38a and the reduction driven gear 38b) rotates and vibrates due to hydraulic fluctuations (hydraulic pulsations) according to the driving frequency of the electromagnetic valve that adjusts the hydraulic pressure of the transfer clutch 41, sometimes causing noise (gear rattle) to occur.

The TCU 70 has a function of preventing the occurrence of noise (gear rattle) from the reduction gear 38 without reducing the hydraulic pressure (engaging force) of the transfer clutch 41 when the steering wheel 15 is steered during coasting in which the accelerator pedal is released (i.e., turned off). In order to achieve this function, the TCU 70 has a first determination unit 71, a second determination unit 72, and a control unit 73. In the TCU 70, the program stored in the EEPROM is executed by the micro-processor so that the functions of the first determination unit 71, the second determination unit 72, and the control unit 73 are realized.

The first determination unit 71 determines whether a first condition in which the torque applied to the reduction drive gear 38a is substantially zero is satisfied. Specifically, the first determination unit 71 functions as a first determination unit according to an example of the present invention. More specifically, the first determination unit 71 determines that the first condition is satisfied when a deviation between the input rotation speed and the output rotation speed of the torque converter 22 provided between the engine 20 (driving source) and the reduction drive gear 38a (i.e., the engine rotation speed and the turbine rotation speed/primary-pulley rotation speed (input rotation speed of the CVT 30)) is smaller than or equal to a predetermined rotation speed (e.g., 150 rpm).

As an alternative to the above-described determination method, the first determination unit 71 may determine that the first condition is satisfied when a sum value of an output torque (engine torque) of the engine 20 and an internal circulation torque is smaller than or equal to a predetermined value (substantially zero). The internal circulation torque is determined in accordance with the vehicle speed and the steering angle (turning angle). More specifically, the EEPROM of the TCU 70 stores a map (internal-circulation-torque map) in which the relationship among the vehicle speed (km/h), the steering angle (degree), and the internal circulation torque (N) is defined, and the internal circulation torque is acquired by searching through this internal-circulation-torque map based on the vehicle speed and the steering angle. The determination result obtained by the first determination unit 71 (i.e., information indicating whether the first condition is satisfied) is output to the control unit 73.

The second determination unit 72 determines whether a second condition in which the transfer clutch 41 receives hydraulic pressure (i.e., engages) and the torque applied to the reduction driven gear 38b is substantially zero is satisfied. Specifically, the second determination unit 72 functions as a second determination unit according to an example of the present invention. More specifically, the second determination unit 72 determines that the second condition is satisfied when the opening degree of the accelerator pedal is smaller than or equal to a predetermined opening degree (e.g., 0.6 degrees) (i.e., the accelerator pedal is turned off), the vehicle speed corresponds to a coasting mode at a predetermined speed (e.g., 10 to 20 km/h), and the front-rear differential rotation of the transfer clutch 41 is larger than or equal to a predetermined rotation speed.

As an alternative to the above-described determination method, the second determination unit 72 may determine that the second condition is satisfied when the opening degree of the accelerator pedal is smaller than or equal to a predetermined opening degree (e.g., 0.6 degrees) (i.e., the accelerator pedal is turned off), the vehicle speed corresponds to a coasting mode at a predetermined speed (e.g., 10 to 20 km/h), the differential rotation between the front wheels 10FL and 10FR (main driving wheels) and the rear wheels 10RL and 10RR (sub driving wheels) is larger than or equal to a predetermined rotation speed.

As another alternative to the above-described determination method, the second determination unit 72 may determine that the second condition is satisfied when the opening degree of the accelerator pedal is smaller than or equal to a predetermined opening degree (e.g., 0.6 degrees) (i.e., the accelerator pedal is turned off), the AWD vehicle 4 is in a coasting mode in which the vehicle speed is equal to a predetermined speed (e.g., 10 to 20 km/h), and the steering angle of the steering wheel 15 is larger than or equal to a predetermined angle (e.g., 250 degrees). The determination result obtained by the second determination unit 72 (i.e., information indicating whether the second condition is satisfied) is output to the control unit 73.

In a case where it is determined that the first and second conditions are satisfied, the control unit 73 applies hydraulic pressure to the reverse brake 29 constituting the forward-reverse switching mechanism 27 so as to adjust the torque applied to the primary shaft 32 (i.e., the reduction drive gear 38a). Specifically, the control unit 73 functions as a control unit according to an example of the present invention. More specifically, when the first and second conditions are satisfied, the control unit 73 drives (opens) the solenoid valve 61 so as to apply hydraulic pressure to the reverse brake 29. Accordingly, friction is applied to the primary shaft 32, so that the torque balance in the reduction gear 38 is eliminated. In other words, the loose state of the tooth flank of the reduction gear 38 is resolved.

Figure 3:
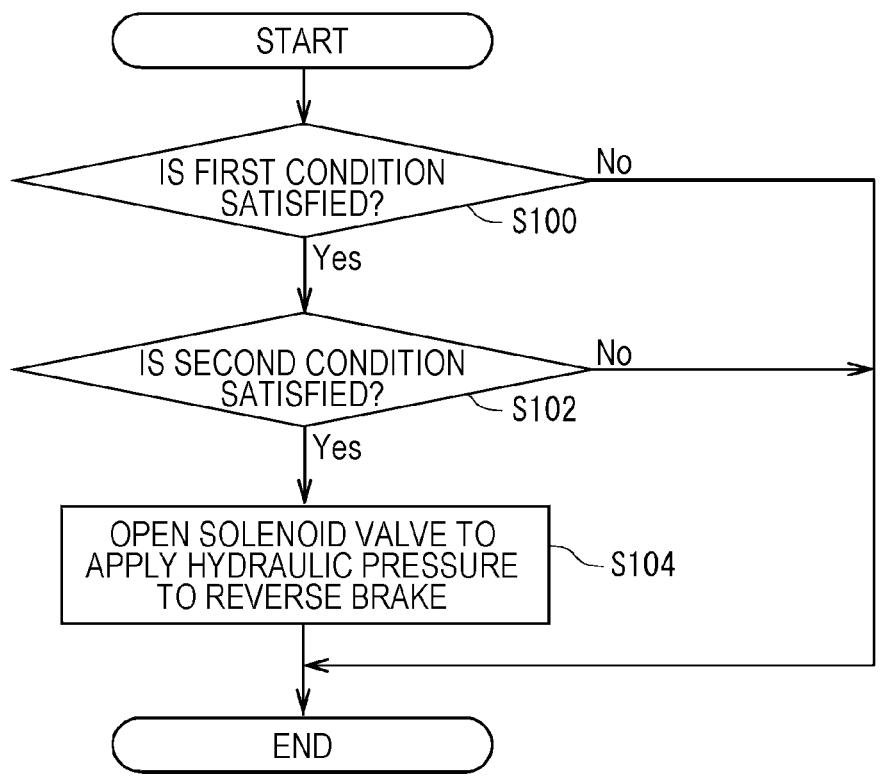
FIG. 3 is a flowchart illustrating the procedure of a noise (gear rattle) prevention process performed by the all-wheel-drive-vehicle controller according to the example.

Next, the operation of the all-wheel-drive-vehicle controller 1 will be described with reference to FIG. 3. FIG. 3 is a flowchart illustrating the procedure of a noise (gear rattle) prevention process performed by the all-wheel-drive-vehicle controller 1. This process is repeatedly executed mainly in the TCU 70 at a predetermined timing.

In step S100, it is determined whether the first condition in which the torque applied to the reduction drive gear 38a is substantially zero is satisfied. Since the method of determining whether the first condition is satisfied has already been described above, a detailed description will be omitted here. If the first condition is not satisfied, the process temporarily ends. In contrast, when the first condition is satisfied, the process proceeds to step S102.

In step S102, the transfer clutch 41 receives hydraulic pressure (i.e., engages), and it is determined whether the second condition in which the torque applied to the reduction driven gear 38b is substantially zero is satisfied. Since the method of determining whether the second condition is satisfied has already been described above, a detailed description will be omitted here. If the second condition is not satisfied, the process temporarily ends. In contrast, when the second condition is satisfied, the process proceeds to step S104.

In a case where it is determined that both the first and second conditions are satisfied, the process proceeds to step S104 where hydraulic pressure is applied to the reverse brake 29 constituting the forward-reverse switching mechanism 27 so as to adjust the torque applied to the primary shaft 32 (i.e., the reduction drive gear 38a). More specifically, the solenoid valve 61 is driven (opened) so that hydraulic pressure is applied to the reverse brake 29. Accordingly, friction is applied to the primary shaft 32, so that the torque balance in the reduction gear 38 is eliminated. Thus, the loose state of the tooth flank between the reduction drive gear 38a and the reduction driven gear 38b (i.e., a state where the torque applied to the pair of gears is substantially zero) is resolved, so that the occurrence of noise (gear rattle) is prevented.

As described above in detail, in this example, in a case where it is determined that the first condition in which the torque applied to the reduction drive gear 38a is substantially zero is satisfied and that the second condition in which the transfer clutch 41 receives hydraulic pressure and the torque applied to the reduction driven gear 38b is substantially zero is satisfied, hydraulic pressure is applied to the reverse brake 29 constituting the forward-reverse switching mechanism 27. Specifically, when it is determined that the tooth flank between the reduction drive gear 38a and the reduction driven gear 38b is in a loose state (i.e., a state where the backlash of the reduction gear 38 is not shifted toward either one of the driving side and the coasting side), friction is applied to the reverse brake 29 of the primary shaft 32, so that the torque applied to the reduction drive gear 38a is adjusted, whereby the torque balance (i.e., a zero torque state) in the reduction gear 38 is eliminated. Therefore, the loose state of the tooth flank of the reduction gear 38 (i.e., between the reduction drive gear 38a and the reduction driven gear 38b) is resolved. As a result, when the steering wheel 15 is steered during coasting in which the accelerator pedal is released (i.e., turned off), the occurrence of noise (gear rattle) from the reduction gear 38 can be prevented without reducing the hydraulic pressure (i.e., the engaging force) of the transfer clutch 41.

In a coasting mode where the opening degree of the accelerator pedal is smaller than or equal to the predetermined opening degree (i.e., the accelerator pedal is turned off) and the front-rear differential rotation of the transfer clutch 41 is larger than or equal to the predetermined rotation speed, the rear wheels 10RL and 10RR have a positive torque, and the front wheels 10FL and 10FR have a negative torque. When the two torques (i.e., the positive torque and the negative torque) balance out, the torque applied to the reduction driven gear 38b becomes substantially zero. Therefore, in this case, it can be determined that the second condition is satisfied.

Furthermore, in a coasting mode where the opening degree of the accelerator pedal is smaller than or equal to the predetermined opening degree (i.e., the accelerator pedal is turned off) and the differential rotation between the front wheels 10FL and 10FR and the rear wheels 10RL and 10RR is larger than or equal to the predetermined rotation speed, that is, when differential rotation occurs between the front and rear wheels and the transfer clutch 41 receives hydraulic pressure (i.e., engages), the rear wheels 10RL and 10RR have a positive torque, and the front wheels 10FL and 10FR have a negative torque, as described above. When the two torques (i.e., the positive torque and the negative torque) balance out, the torque applied to the reduction driven gear 38b becomes substantially zero. Therefore, in this case, it can similarly be determined that the second condition is satisfied.

Moreover, in a coasting mode where the opening degree of the accelerator pedal is smaller than or equal to the predetermined opening degree (i.e., the accelerator pedal is turned off) and the steering angle of the steering wheel 15 is larger than or equal to the predetermined angle, differential rotation occurs between the front and rear wheels and the transfer clutch 41 receives hydraulic pressure (i.e., engages). This causes the rear wheels 10RL and 10RR to have a positive torque and the front wheels 10FL and 10FR to have a negative torque, as described above. When the two torques (i.e., the positive torque and the negative torque) balance out, the torque applied to the reduction driven gear 38b becomes substantially zero. Therefore, in this case, it can similarly be determined that the second condition is satisfied.

When a deviation between the rotation speed at the input side and the rotation speed at the output side of the torque converter 22 provided between the engine 20 and the CVT 30 (i.e., the engine rotation speed and the turbine rotation speed (the input rotation speed of the CVT 30)) is smaller than or equal to the predetermined rotation speed, the torque applied to the reduction drive gear 38a becomes substantially zero. Therefore, in this case, it can be determined that the first condition is satisfied.

In a case where the sum value of the output torque (engine torque) of the engine 20 and the internal circulation torque determined in accordance with the vehicle speed and the steering angle is smaller than or equal to the predetermined value (substantially zero), the torque applied to the reduction drive gear 38a becomes substantially zero. Therefore, in this case, it can similarly be determined that the first condition is satisfied.

Although the example of the present invention has been described above, the present invention is not limited to the above-described example and permits various modifications. For instance, although a chain CVT is described as an automatic transmission in the above-described example, alternatives for such a chain CVT include a belt CVT and a toroidal CVT. Furthermore, for instance, a conventional automatic transmission (AT) may be used in place of the CVT.

The configuration of the driving-force transmission system described above (e.g., the configuration of the gear train and the shaft) is not limited to the above-described example. Thus, the pair of gears whose tooth flank is loose when the first and second conditions are satisfied may change in accordance with the configuration of the gear train of the driving-force transmission system and are not limited to the reduction gear 38 (i.e., the reduction drive gear 38a and the reduction driven gear 38b) described above. Moreover, the configuration of the control system is not limited to the above-described example (i.e., the configuration in which each ECU is coupled via the CAN 100).

When the second determination unit 72 is to determine whether the second condition is satisfied, either one of the combination of lateral acceleration (G) and vehicle speed, and the electric power ($\propto$ rudder angle) to be supplied to a power steering wheel may be used in place of the steering angle of the steering wheel 15.

In the above-described example, when the first and second conditions are satisfied, hydraulic pressure is applied to the reverse brake 29 of the forward-reverse switching mechanism 27 so as to apply friction to the primary shaft 32 (i.e., to eliminate the torque balance of the reduction gear 38). Alternatively, instead of applying hydraulic pressure to the reverse brake 29, for instance, the hydraulic pressure on the lock-up clutch 26 constituting the torque converter 22 may be adjusted. As another alternative, the hydraulic pressure on the forward clutch 28 of the forward-reverse switching mechanism 27 may be reduced so as to change the inertia.

As an alternative to the on-off valve used as the solenoid valve 61 in the above-described example, for instance, a linear solenoid valve having a pressure control function may be used (i.e., a configuration that controls the hydraulic pressure and supplies the hydraulic pressure to the reverse brake 29).

Furthermore, as an alternative to the above example that is described with reference to the forward travel mode, the example may be applied to the rearward travel mode. In a case where the example is applied to the rearward travel mode, it is preferable that hydraulic pressure be applied to the forward clutch 28 in place of the reverse brake 29 when the first and second conditions are satisfied.

Accordingly, in an all-wheel-drive-vehicle controller including a transfer clutch that adjusts a torque (driving force) to be transmitted to the sub driving wheels, when the steering wheel is steered during coasting in which the accelerator pedal is released (i.e., turned off), noise (gear rattle) occurring from gears of a driving system can be prevented without reducing the hydraulic pressure (engaging force) of the transfer clutch.

The invention claimed is:

1. An all-wheel-drive-vehicle controller comprising:
a drive gear configured to be coupled to a driving source in a torque transmittable manner;
a driven gear configured to be meshed with the drive gear and coupled to a main driving-wheel axel shaft and a sub-driving-wheel axle shaft in a torque transmittable manner, the main-driving-wheel axel shaft being configured to transmit a torque to a main driving wheel, the sub-driving-wheel axle shaft being configured to transmit a torque to a sub driving wheel;
a transfer clutch interposed between the driven gear and the sub-driving-wheel axle shaft and configured to adjust the torque to be transmitted to the sub driving wheel;
a first determination unit configured to determine whether a first condition in which a torque applied to the drive gear is substantially zero is satisfied;
a second determination unit configured to determine whether a second condition in which hydraulic pressure is applied to the transfer clutch and a torque applied to the driven gear is substantially zero is satisfied; and
a control unit configured to control a torque adjuster so as to adjust the torque applied to either one of the drive gear and the driven gear in a case where the first determination unit determines that the first condition is satisfied and the second determination unit determines that the second condition is satisfied.

2. The all-wheel-drive-vehicle controller according to claim 1,
wherein the torque adjuster is a forward-reverse switching mechanism that is disposed between the driving source and the drive gear and that comprises a forward clutch and a reverse brake, the forward-reverse switching mechanism being configured to switch between a forward travel mode and a rearward travel mode in accordance with an engaged state of each of the forward clutch and the reverse brake, and
wherein in a case where the first determination unit determines that the first condition is satisfied and the second determination unit determines that the second condition is satisfied, the control unit applies hydraulic pressure to the reverse brake included in the forward-reverse switching mechanism.

3. The all-wheel-drive-vehicle controller according to claim 1,
wherein the second determination unit determines that the second condition is satisfied during a coasting mode in which an opening degree of an accelerator pedal is smaller than or equal to a predetermined opening degree and when front-rear differential rotation of the transfer clutch is larger than or equal to a predetermined rotation speed.

4. The all-wheel-drive-vehicle controller according to claim 2,
wherein the second determination unit determines that the second condition is satisfied during a coasting mode in which an opening degree of an accelerator pedal is smaller than or equal to a predetermined opening degree and when front-rear differential rotation of the transfer clutch is larger than or equal to a predetermined rotation speed.

5. The all-wheel-drive-vehicle controller according to claim 1,
wherein the second determination unit determines that the second condition is satisfied during a coasting mode in which an opening degree of an accelerator pedal is smaller than or equal to a predetermined opening degree and when differential rotation between the main driving wheel and the sub driving wheel is larger than or equal to a predetermined rotation speed.

6. The all-wheel-drive-vehicle controller according to claim 2,
wherein the second determination unit determines that the second condition is satisfied during a coasting mode in which an opening degree of an accelerator pedal is smaller than or equal to a predetermined opening degree and when differential rotation between the main driving wheel and the sub driving wheel is larger than or equal to a predetermined rotation speed.

7. The all-wheel-drive-vehicle controller according to claim 1,
wherein the second determination unit determines that the second condition is satisfied during a coasting mode in which an opening degree of an accelerator pedal is smaller than or equal to a predetermined opening degree and when a steering angle of a steering wheel is larger than or equal to a predetermined angle.

8. The all-wheel-drive-vehicle controller according to claim 2,
wherein the second determination unit determines that the second condition is satisfied during a coasting mode in which an opening degree of an accelerator pedal is smaller than or equal to a predetermined opening degree and when a steering angle of a steering wheel is larger than or equal to a predetermined angle.

9. The all-wheel-drive-vehicle controller according to claim 1,
wherein the first determination unit determines that the first condition is satisfied when a deviation between an input rotation speed and an output rotation speed of a torque converter disposed between the driving source and the drive gear is smaller than or equal to a predetermined rotation speed.

10. The all-wheel-drive-vehicle controller according to claim 2, wherein the first determination unit determines that the first condition is satisfied when a deviation between an input rotation speed and an output rotation speed of a torque converter disposed between the driving source and the drive gear is smaller than or equal to a predetermined rotation speed.

11. The all-wheel-drive-vehicle controller according to claim 1, wherein the first determination unit determines that the first condition is satisfied when a sum value of an output torque of the driving source and an internal circulation torque determined in accordance with a vehicle speed and a steering angle is smaller than or equal to a predetermined value.

12. The all-wheel-drive-vehicle controller according to claim 2, wherein the first determination unit determines that the first condition is satisfied when a sum value of an output torque of the driving source and an internal circulation torque determined in accordance with a vehicle speed and a steering angle is smaller than or equal to a predetermined value.

13. An all-wheel-drive-vehicle controller comprising:

a drive gear configured to be coupled to a driving source in a torque transmittable manner;

a driven gear configured to be meshed with the drive gear and coupled to a main driving-wheel axel shaft and a sub-driving-wheel axle shaft in a torque transmittable manner, the main-driving-wheel axel shaft being configured to transmit a torque to a main driving wheel, the sub-driving-wheel axle shaft being configured to transmit a torque to a sub driving wheel;

a transfer clutch interposed between the driven gear and the sub-driving-wheel axle shaft and configured to adjust the torque to be transmitted to the sub driving wheel; and circuitry configured to determine whether a first condition in which a torque applied to the drive gear is substantially zero is satisfied;

determine whether a second condition in which hydraulic pressure is applied to the transfer clutch and a torque applied to the driven gear is substantially zero is satisfied; and control a torque adjuster so as to adjust the torque applied to either one of the drive gear and the driven gear in a case where the first condition and the second condition are determined to be satisfied.

* * * * *